United States Patent
Feiste (10) Patent No.: US 7,412,589 B2
(45) Date of Patent: Aug. 12, 2008

(54) METHOD TO DETECT A STALLED INSTRUCTION STREAM AND SERIALIZE MICRO-OPERATION EXECUTION

(75) Inventor: Kurt Alan Feiste, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 11/278,275

(22) Filed: Mar. 31, 2006

(65) Prior Publication Data

US 2007/0234018 A1    Oct. 4, 2007

(51) Int. Cl.
*G06F 7/38* (2006.01)

(52) U.S. Cl. .................................... 712/220

(58) Field of Classification Search ............... 712/220
See application file for complete search history.

(56) References Cited

U.S. PATENT DOCUMENTS 5,896,523 A * 4/1999 Bissett et al. ............... 713/400
6,550,002 B1 * 4/2003 Davidson et al. ........... 712/216

* cited by examiner

*Primary Examiner*—Eddie Chan
*Assistant Examiner*—John Lindlof
(74) *Attorney, Agent, or Firm*—Duke W. Yee; D'Ann N Rifai; Lisa L. B. Yociss

(57) ABSTRACT

A computer implemented method, apparatus, and computer usable program code for ensuring forward progress of instructions in a pipeline of a processor. Instructions are received in the pipeline. Instruction flushes are counted in the pipeline to determine a flush count. A single step mode in the pipeline is entered in response to the flush count exceeding a threshold. The single step mode instructions are issued in serial such that an instruction is not issued for execution until a prior instruction has completed execution.

10 Claims, 5 Drawing Sheets

FIG. 9

METHOD TO DETECT A STALLED INSTRUCTION STREAM AND SERIALIZE MICRO-OPERATION EXECUTION

BACKGROUND

1. Field of the Invention

The present application relates generally to information handling and more particularly to a computer implemented method, apparatus, and computer usable program code for detecting a lack of forward process in an instruction stream and serializing micro-operation execution.

2. Description of the Related Art

Data processing systems are used by increasing numbers of businesses and individuals each year. These data processing systems help users to efficiently process data and information. To a large extent, the efficiency of the data processing system relies on processing instructions as fast as possible. The escalating complexity of microprocessors and the real-time interaction of multiple instructions make it difficult to guarantee that an instruction stream makes forward progress in all situations. Forward progress indicates that instructions are generally moving forward and are being executed. Forward progress may be quantified by a user specified threshold such as cycles, flushes, passage of time, or other system indicators.

Guaranteeing instruction stream progress is especially difficult when multiple threads are present. Difficulties also arise when parts of the architected instruction set must be translated to microcode routines, and the microcode routines are not re-entrant. A microcode routine or a microcode program implements a central processing unit instruction set. Just as a single high level language statement is compiled to a series of machine instructions, each machine instruction is in turn implemented by a series of micro-instructions or micro-operations, sometimes called microcode. On most computers the microcode is not produced by a compiler, but exists in a special high speed memory. Microcode routines are often used to correct bugs in the instruction set, to implement new machine instructions, or more commonly to maintain compatibility with previous microprocessors. Often, when an instruction set architecture is maintained over several generations of microprocessors, instructions that were efficiently implemented in hardware in a previous generation may not map efficiently on newer generation microprocessors that take advantage of superscalar or superpipelining techniques. Microcode may also allow one computer microarchitecture to emulate another, usually more-complex architecture. A microcode routine that is not re-entrant means that if a microcode instruction in the routine is flushed, the routine must be restarted from the beginning.

In some cases, because of dependencies, errors, conflicts, or other glitches, a microcode routine may be flushed multiple times before the microcode routine is completed. Each time the microcode routine is flushed, processing resources have been wasted and the process must be restarted anew. In other cases, the microcode routine may become permanently stalled in the instruction stream stalling the progress of the instruction stream and consuming processing resources.

SUMMARY

The aspects of the present invention provide a computer implemented method, apparatus, and computer usable program code for ensuring forward progress of instructions in a pipeline of a processor. Instructions are received in the pipeline. Instruction flushes are counted in the pipeline to determine a flush count. A single step mode in the pipeline is entered in response to the flush count exceeding a threshold. The single step mode instructions are issued in serial such that an instruction is not issued for execution until a prior instruction has completed execution.

BRIEF DESCRIPTION OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

DETAILED DESCRIPTION OF THE PREFERRED EMBODIMENT

Figure 1:
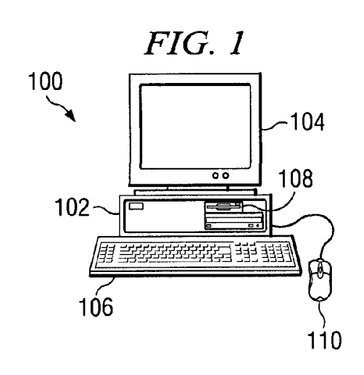
FIG. 1 is pictorial representation of a information handling system in which the aspects of the present invention may be implemented.

With reference now to the figures and in particular with reference to FIG. 1, a pictorial representation of a information handling system in which the aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of information handling systems, such as a network computer. Computer 100 also preferably includes a graphical user interface (GUI) that may be implemented by means of systems software residing in computer readable media in operation within computer 100.

Figure 2:
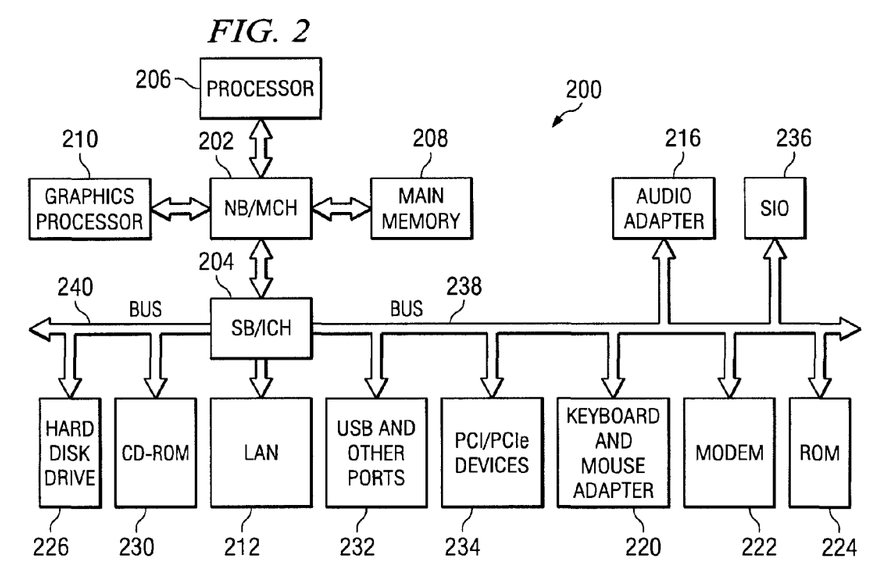
FIG. 2 is a block diagram of a information handling system in which aspects of the present invention may be implemented.

With reference now to FIG. 2, a block diagram of a information handling system is shown in which aspects of the present invention may be implemented. Information handling system 200 is an example of a computer, such as computer 100 in FIG. 1, in which code or instructions implementing the processes of the present invention may be located. In the depicted example, information handling system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Processor 206 may contain a set of one or more processors. When more than one processor is present, these processors may be separate processors in separate packages. Alternatively, processor 206 may have multiple heterogeneous cores in a single chip package. Heterogeneous refers to two or more cores having a different instruction set, such as the Cell Broadband Engine™ processor. Further, the processors may be multiple multi-core units. Graphics processor 210 may be connected to the MCH through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

An operating system runs on processor 206 and coordinates and provides control of various components within information handling system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on information handling system 200 (Java is a trademark of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the present invention are performed by processor 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor information handling system.

In some illustrative examples, information handling system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, information handling system 200 also may be a tablet computer, laptop computer, or telephone device in addition to taking the form of a PDA.

Aspects of the present invention provide a computer implemented method, apparatus, and computer usable program code for detecting a lack of forward progress in an instruction stream and serializing micro-operation execution. Forward progress indicates that instructions are generally moving forward and are being executed. If a recorded number of flushes reach a threshold, the system is not making acceptable forward progress or has stalled. A method is described to detect a potential deadlock in a highly pipelined architecture. When the method detects a deadlock or other lack of forward progress of an architected instruction, each micro-operation is treated in series until the architected instruction completes. By serializing the microcode routine, the instruction stream makes slow, but forward progress. Once forward progress is made, the microprocessor goes back into normal mode allowing fully pipelined operation.

Figure 3:
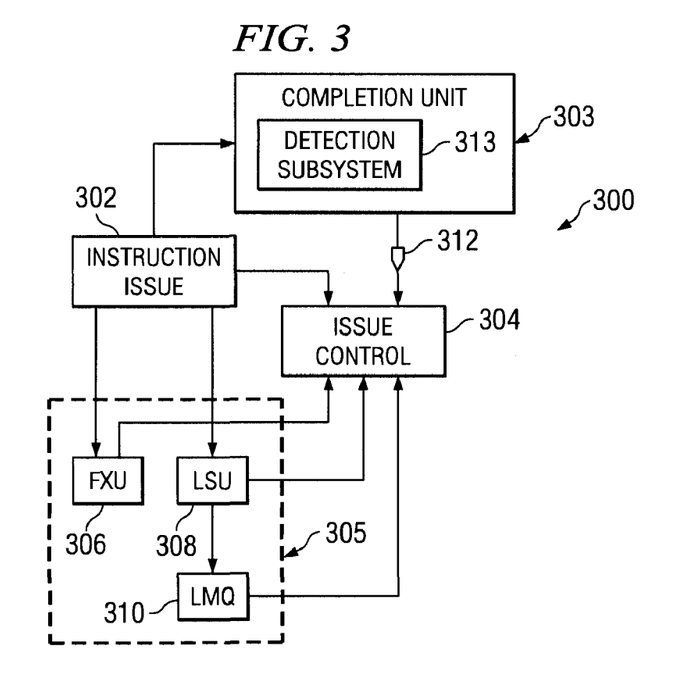
FIG. 3 is a block diagram of an instruction issue system in accordance with an illustrative embodiment of the present invention.

FIG. 3 is a block diagram of an instruction issue system in accordance with an illustrative embodiment of the present invention. Instruction issue system 300 includes components that may be used to issue instructions and control instruction issue. Instruction issue system 300 may be stored or loaded into a high-speed memory component such as memory 108 of FIG. 1. The instructions generated by instruction issue system may be executed by a processor such as processor 206 of FIG. 2.

Instruction issue 302 issues instructions to be executed to completion unit 303. Issue control 304 controls when instructions are issued from instruction issue 302. Completion unit 303 is a part of a processor core that completes instructions in a processor such as processor 206 of FIG. 2. Completion unit 303 may also include a memory for use with the processing functions of the processing core. Instruction issue 302 may issue instructions to any number of components in execution block 305. For example, execution block 305 may include fixed point unit (FXU) 306, load/store unit (LSU) 308, and load miss queue (LMQ) 310. The fixed point unit 306 performs fixed-point arithmetic operations. The load/store unit 310 loads and stores operations from a memory subsystem, such as a store queue. The load miss queue 312 holds information on load data cache misses.

Figure 4:
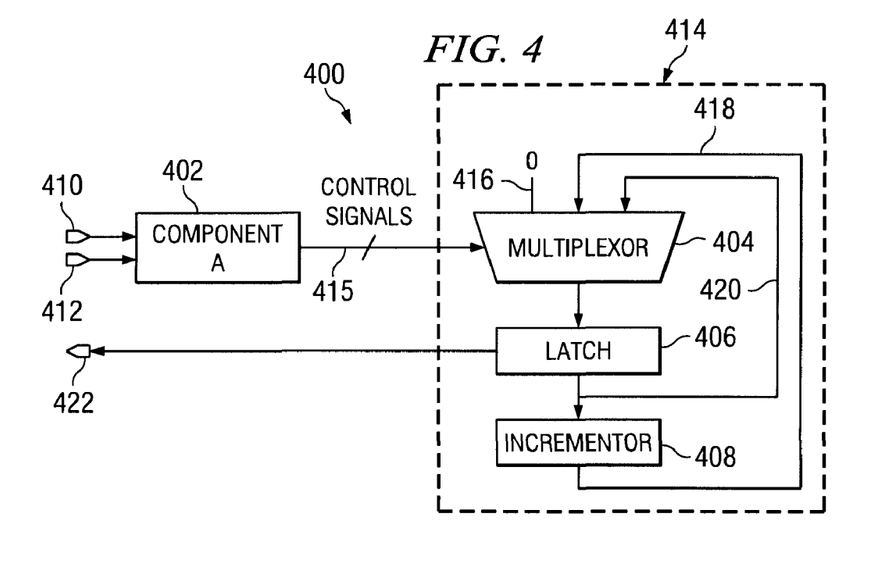
FIG. 4 is a block diagram for exemplary single step control circuitry in accordance with an illustrative embodiment of the present invention.

Completion unit 303 includes detection subsystem 313. Detection subsystem 313 determines whether architected instructions are making forward progress. Single step mode input 312 may be received as an input into issue control 304 any time an architected instruction is not making significant forward progress in the pipeline. An architected instruction refers to an instruction that is defined in the microprocessor architecture. The architected instruction is a contract between a programmer and the microprocessor designer that defines how the microprocessor operates. For example, if an architected instruction implemented by a microcode routine is deadlocked, the single step mode input 312 is asserted.

In another illustrative embodiment, detection subsystem may be implemented external to the processor and instruction issue system 300.

Single step mode input 312 is an input into issue control 304 that tells issue control 304 to go into a single step mode. Single step mode input 312 may be output by single step mode control circuitry within detection subsystem 313 as further described in FIG. 4.

When single step mode input 312 is received, issue control 304 requires that instruction issue 302 issue instructions in serial until the architected instruction which is implemented by the microcode routine is completed. As a result, instruction issue 302 makes slow progress until all of the instructions in the microcode routine have been issued by instruction issue 302 and completely execution. Single step mode input 312 may be output and controlled by any number of hardware devices. In addition, single step mode input 312 may be used for synchronizing and debugging instructions.

Once the architected instruction has been completed, execution components in execution block 305 instruction issue 302 may inform issue control 304 that the architected instruction has been completed. Issue control 304 may reinitiate normal instruction issue control signals at that point allowing the instruction issue system 300 to function in fully pipelined mode. An architected instruction completing refers to the architected instruction having caused all the state change and behavior defined for execution of the instruction in the architecture.

FIG. 4 is a block diagram for exemplary single step control circuitry in accordance with an illustrative embodiment of the present invention. Single step control circuitry 400 may be implemented in a detection subsystem such as detection subsystem 313 of FIG. 3.

Single step control circuitry 400 includes various components including component A 402, multiplexor 404, latch 406, and incrementor 408. Component A 402 is further described in FIG. 5. Component A 402 receives various control signals as inputs including architected instruction complete 410 and flush 412. Instruction complete 410 and flush 412 may be indicated by a completion unit such as completion unit 303 of FIG. 3. Single step control circuitry 400 counts instruction flushes indicated by input flush 412 and resets counter 414 when an architected instruction completes successfully as indicated by architected instruction complete 410. Once the flush count reaches a threshold the microprocessor serializes all micro-operations at the issue point to eliminate interactions between the micro-operations. The threshold indicates that forward progress has not been made for the architected instruction. Micro-operations are the actions performed due to the execution of micro-instructions.

Instruction flushes refer to the mechanism or component in microprocessors that take corrective actions for misprediction or exception situations. When an instruction flush occurs, instructions are typically re-fetched and an attempt is made to re-execute the instructions at the point the misprediction occurred. Instruction flushes may occur at any time based on internal and/or external control signals and interrupts.

Component A 402 determines whether the flush count recorded by counter 414 should be reset, incremented, or held. Component A 402 tells multiplexor what value to pass through to multiplexor 404 via control signals 415. Control signals tells multiplexor to reset, increment, or hold the value stored in latch 406.

Counter 414 may be implemented in any number of ways. In one illustrative embodiment, counter 414 is implemented using multiplexor 404, latch 406, and incrementor 408. Component A 402 issues control signals 415 to multiplexor 404. The output of multiplexor 404 provides input into latch 406. Latch 406 records the flush count and may also be a register. Inputs to multiplexor 404 are input one 416 zero or logic low, input two 418 the incremented value of latch 406 as incremented by incrementor 408, and input three 420 the output of latch 406.

The default selection of control signals 415 into multiplexor 404 is for latch 406 to retain the same value by selecting input three 420. If flush 412 is asserted, control signals 415 tells multiplexor 404 to pass input two 418 to latch 406 incrementing the flush count held in latch 406 by one. If architected instruction complete 410 is asserted, control signals 415 pass input one 416 through multiplexor 404 to latch 406 resetting the flush count to zero. The reset mechanism through input one 416 has priority over the increment mechanism of input two 418, as it is possible for an instruction to complete, but causes all younger instructions to flush.

In the following example, the unaligned load word instruction is microcoded into several load byte instructions, with shifts used to construct the load word.

```
Unaligned load
architected instruction
    load word R1,R2,R3   ; Contents of memory location
                         [R2+R3] loaded into R1
microcode instructions
    add   T1,R2,R3   ; Add R2,R3 result into special
          microcode
register
    load byte   R1,T1[0000] ; Load individual bytes
                            first byte direct in R1
    load byte   T2,T1[0001] ; Load second byte into T2
    shift    T2,T2[0008]    ; shift 8 bits
    or          R1,R1,T2    ; combine with previous byte
    load byte   T2,T1[0002] ; load third byte in T2
    shift            T2,T2[0016]    ; shift 16 bits
    or          R1,R1,T2    ; combine with previous byte
    load byte   T2,T1[0003] ; load forth byte into T2
    shift            T2,T2[0024]    ; shift 24 bits
    or          R1,R1,T2    ; combine with previous byte
```

If the load instruction crosses a cache line, the above code may cause two flushes if both cache lines are cache misses. The routine would be executed twice, but would not go into single step mode because the threshold of seven was not met indicating there is not a deadlock.

The following is another example of an architected instruction.

```
architected instruction
    store multiple R4,R1,R2   ; Contents of R4,R5, . . . ,R31
    stored into memory starting at memory location [R1+R2]
microcode instructions
    add T1,R1,R2   ; Add R2,R3 result into special
microcode register
    store R4,T1[0000]   ; Store R4
    store          R5,T1[0001]       ; Store R5
    . . .
    store          R31,T1[0027]      ; Store R31
```

If there are only eight store queue entries, and overrunning the store queue causes a flush, the above microcode routine might never complete, since it would start over after attempting to store eight entries.

For example, once latch 406 reaches the threshold, such as eight, latch 406 sends single step mode 422. Single step mode 422 is the control signal single step mode input 312 sent to issue control 304 of FIG. 3. Single step mode 422 tells the microprocessor to serialize all micro-operations at the issue point until all previous micro-operations have completed. In the example above, each store would complete before the next store would be issued. Single step mode 422 may be used with existing single step mode or troubleshooting protocols without adding additional hardware elements.

By holding the micro-operations at the issue point until all previous micro-operations have completed, most interactions between the micro-operations that may cause deadlocks or lack of forward progress are eliminated. Once the architected instruction completes, indicating forward progress has been made, architected instruction complete 410 is asserted and component A 402 commands multiplexer 404 to pass through input one 416 resetting the flush count held in latch 406. Additionally, single step mode 422 is not asserted so that the microprocessor returns to fully pipelined mode for normal instruction issue.

Single step control circuitry 400 is meant only as one example of components that may be used to assert a signal telling the microprocessor to enter a single step mode. Various other counters, logic, and components may be used without departing from the scope of illustrative embodiments of the present invention.

Figure 5:
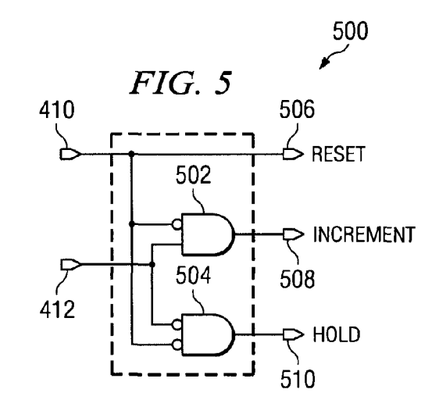
FIG. 5 is a block diagram of control signal logic in accordance with an illustrative embodiment of the present invention.

FIG. 5 is a block diagram of control signal logic in accordance with an illustrative embodiment of the present invention. Component A 500 is a more detailed diagram of component A 402 of FIG. 4. Component A 500 is a control component for generating control signals for a counter. Component A 500 includes input signals architected instruction complete 410 and flush 412. In one illustrative embodiment, component A 402 includes AND gate 502 and NAND gate 504. AND gate 502 includes one inverter for inverting architected instruction complete 410.

Component A 402 has three outputs, output one 506, output two 508, and output three 510. Output one 506, output two 508, and output three 510 are examples of control signals used to control a counter such as counter 414 of FIG. 4. For example, output one 506, output two 508, and output three 510 may be control signals such as control signals 415 of FIG. 4 used to control a multiplexer such as multiplexer 404 of FIG. 4.

Output one 506 is a control signal that represents architected instruction complete 410 as passed through component A 500 without modification. Output one 506 tells the counter to reset or return to zero.

Output two 508 is a control signal that tells the counter to increment. Output two 508 is generated by passing an inverted value of architected instruction complete 410 and flush 412 into AND gate 502. As a result, output two 508 is asserted only when architected instruction complete is not asserted 410 and flush 412 is inserted. Output two 508 increments the counter if architected instruction complete 410 is not asserted at the same time as flush 412 to ensure that architected instruction complete 410 and corresponding output one 506 has priority over output two 508 to reset the counter.

Output three 510 tells the counter to hold the current value. Output three 510 is generated by passing architected instruction complete 410 and flush 412 into NAND gate 504. As a result, output three 510 is asserted only when architected instruction complete 410 and flush 412 are not asserted. As a result, output one 506 and output two 508 have priority over output three 510.

The logic of component A 500 is meant only as one example of logic that may be used to control a counter or other circuitry for entering a single step mode. Various logic configurations may be used to control the counter.

Figure 6:
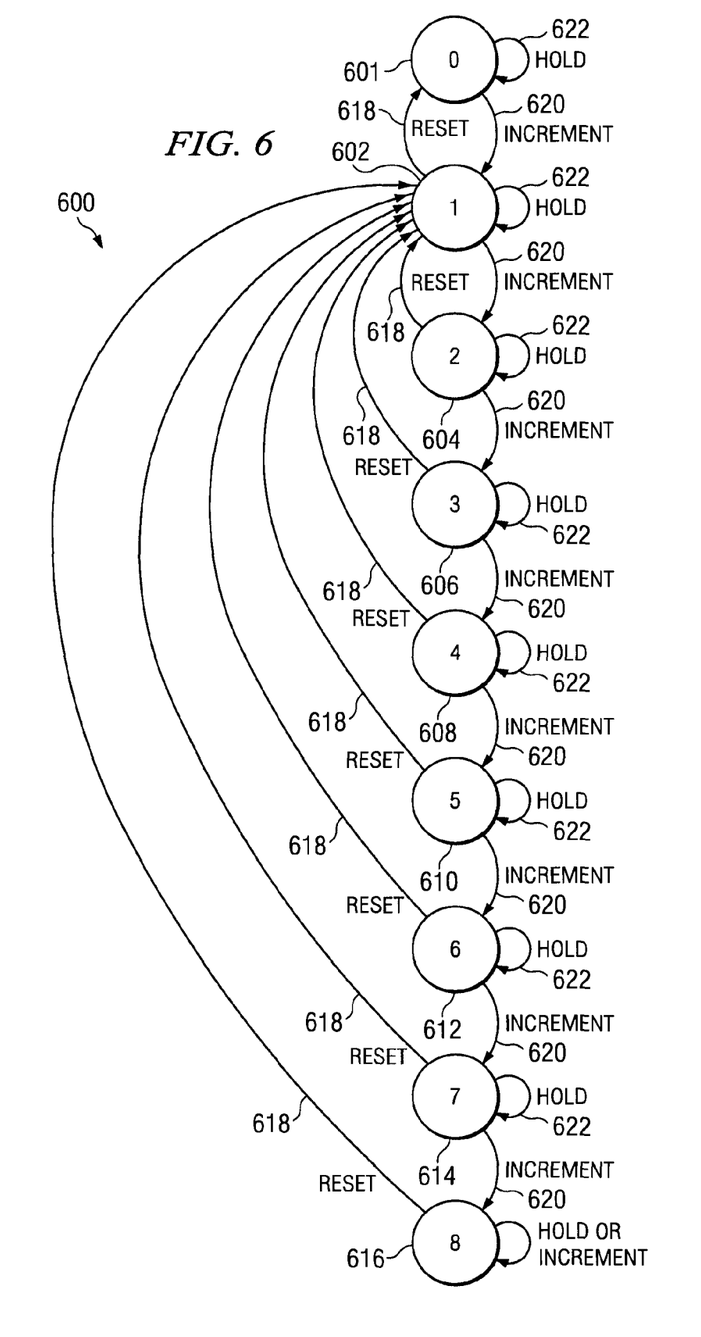
FIG. 6 is a state diagram of a counter in accordance with an illustrative embodiment of the present invention.

FIG. 6 is a state diagram of a counter in accordance with an illustrative embodiment of the present invention. State diagram 600 represents the state of a instruction issue system instruction issue system 300 of FIG. 3. More particularly, state diagram 600 represents the numeric count of a counter such as counter 414 of FIG. 4. State diagram 600 includes state 0 601, state 1 602, state 2 604, state 3 606, state 4 608, state 5 610, state 6 612, state 7 614, and state 8 616. Each state represents the flush count used by the counter to determine whether the counter has reached the threshold.

Reset (R) 618, increment (I) 620, and Hold (H) 622 are representative of control signals such as input one 506, input two 508, and input three 510 of FIG. 5 respectively. For example, if the system is in state 6 612, the system is fully pipelined and performing normal instruction issue. If reset 618 is asserted, the state becomes state 0 601 and the system continues to function normally. If hold 622 is asserted, the state is still state 6 612 and the system functions normally. If increment 620 is asserted, the state becomes state 7 614 and continues to function normally. However, in state 7 614, if increment 620 is asserted, the counter enters state 8 616 and the system enters single step mode.

During states 1 602-state 7 614 the system performs normal instruction issue. The threshold is reached when the counter reaches state 8 616, and as a result the system enters single step mode. The system may enter single step mode when a control signal such as single step mode 422 of FIGS. 4-5 is asserted. The system remains in the single step mode of state 8 616 if hold 622 or increment 620 is asserted. The system only leaves single step mode when reset 618 is asserted. Reset 618 is a system control signal such as architected instruction complete 410 of FIG. 4.

Figures 7, 8:
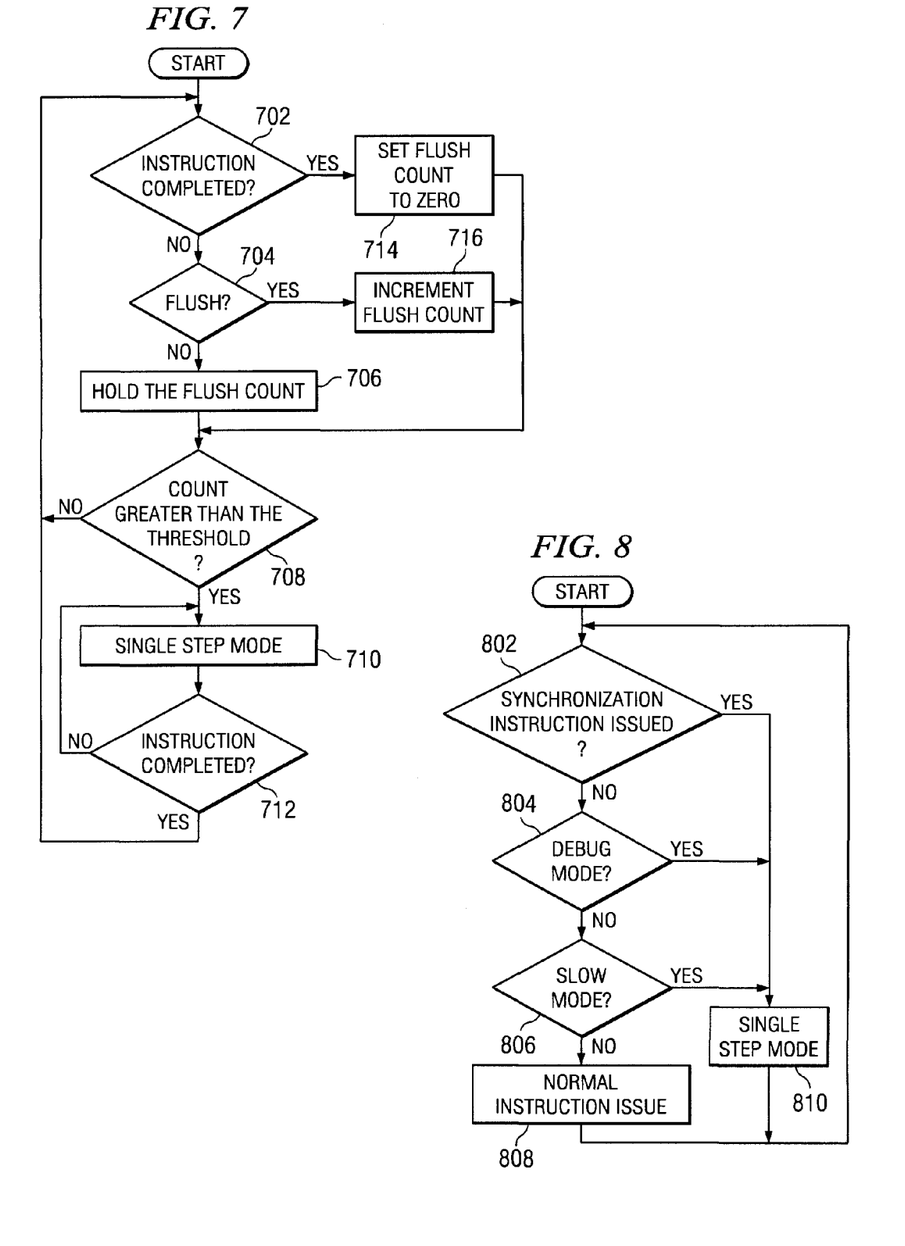
FIG. 7 is a flowchart for serializing microinstructions in accordance with an illustrative embodiment of the present invention.
FIG. 8 is a flowchart illustrating instruction issue modes in accordance with an illustrative embodiment of the present invention.

FIG. 7 is a flowchart for serializing microinstructions in accordance with an illustrative embodiment of the present invention. FIG. 7 may be implemented in a system such as single step control circuitry 400 of FIG. 4. The process begins by determining whether an instruction is completed (step 702). The instruction may be a specified architected instruction that is being monitored. If the instruction is not completed, the process determines whether the pipeline has been flushed (step 704). If the pipeline has not been flushed, the process holds the count value (step 706). The flush count may be held by asserting a control signal such as 510 of FIG. 5. The flush count remains unchanged and does not increase toward the threshold.

Next, the process determines whether the flush count is greater than the threshold (step 708). If the count is greater than the threshold, the system enters single step mode (step 710). Next, the process determines if the instruction is complete (step 712). If the instruction has not been completed, the system remains in single step mode (step 710). The system remains in single step mode, until the instruction is completed in step 712. For example, the threshold may be seven flushes. Once the flush count reaches eight or more flushes, the process enters single step mode until the architected instruction is executed. Next, the process returns to the determination of step 702.

If the process determines that the instruction is completed in step 702, the process sets the flush count to zero (step 714). The flush count may be reset by asserting a control signal such as 506 of FIG. 5. The process then determines if the count is greater than the threshold (step 708).

If the process determines that the system has been flushed in step 704, the process increments the flush count (step 716). The flush count may be incremented by asserting a control signal such as 508 of FIG. 5.

FIG. 8 is a flowchart illustrating instruction issue modes in accordance with an illustrative embodiment of the present invention. FIG. 8 may be implemented in an instruction issue system such as instruction issue system 300 of FIG. 3. The process begins by determining whether a synchronization instruction was issued (step 802). A synchronization or sync instruction causes the microprocessor to halt issue of instructions until all previous are completed. It acts as a barrier instruction to enforce strict program order. Synchronization instructions are detected by instruction decode.

If the process determines a synchronization instruction was not issued, the process determines whether the system is in debug mode (step 804). The system is considered to be in debug mode if a debug control signal is asserted telling the system to go into debug mode.

If the system is not in debug mode, the process determines if the system is in slow mode (step 806). The system proceeds with normal instruction issue (step 808) before returning to the determination of step 802. If the process determines a synchronization instruction was issued in step 802, the system enters single step mode (step 810) before returning to the determination of step 802. Single step mode may involve serializing all instructions in the pipeline to avoid dependency conflicts. A dependency refers to one instruction that references another instruction or must be executed in a set order before or after the other instruction. Single step mode, may be entered by receiving a control signal such as 312 of FIG. 3.

If the process determines the system is in debug mode in step 804, the system enters single step mode (step 810) before returning to the determination of step 802. If the process determines the system is in slow mode in step 806, the system enters single step mode (step 810) before returning to the determination of step 802.

Figure 9:
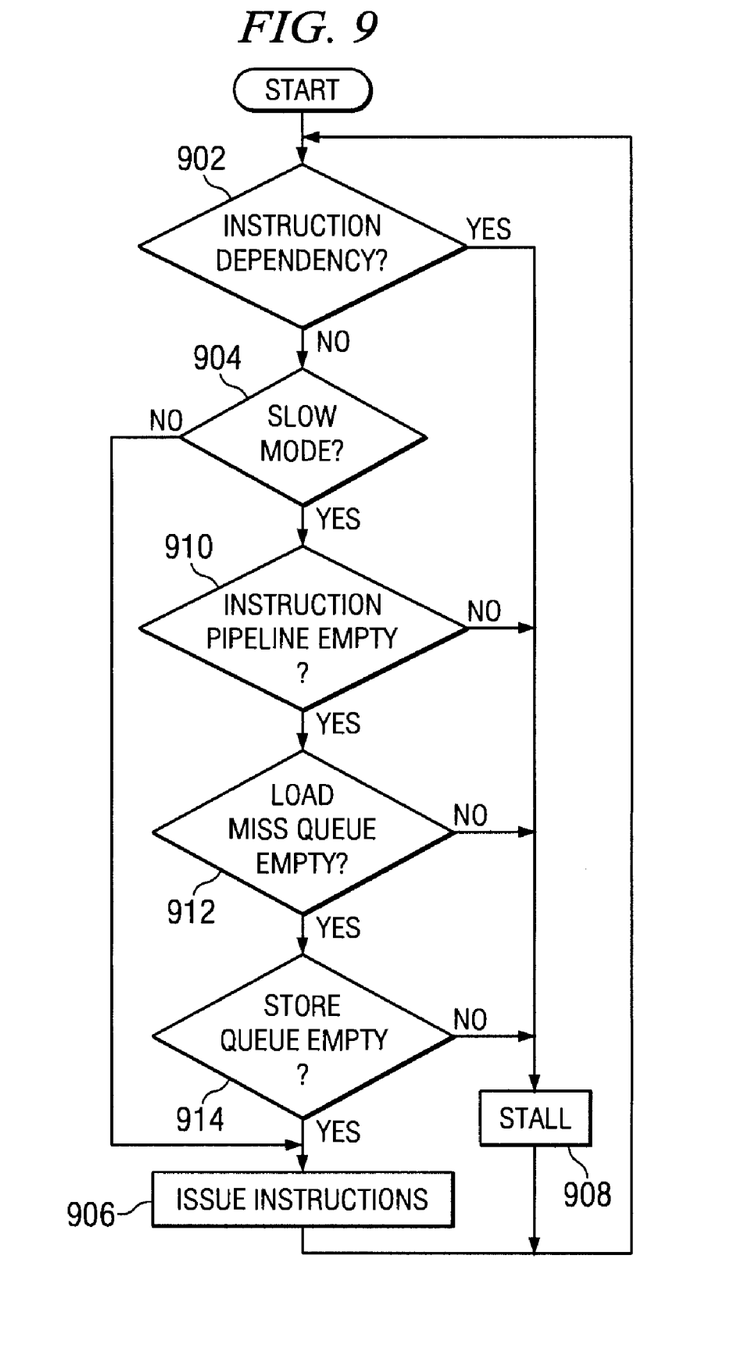
FIG. 9 is a flowchart illustrating single step mode on instruction issue.

FIG. 9 is a flowchart illustrating single step mode on instruction issue. FIG. 9 may be implemented in an instruction issue system such as instruction issue system 300 of FIG. 3. The process begins by determining whether there are instruction dependencies (step 902). If there are not instruction dependencies, the process determines if the system is in slow mode (step 904). If the system is not in slow mode, the process issues instructions (step 906) before returning to the determination of step 902.

If the process determines there are instruction dependencies in step 902, the process issues a stall (step 908) before returning to step 902. The stall prevents instruction issue to insure that dependencies, such as input operand dependencies, are resolved before an instruction issues. If the process determines the system is in slow mode in step 904, the process determines if the instruction pipeline is empty (step 910). If process determines the instruction pipeline is not empty, the process issues a stall (step 908).

If the process determines the instruction pipeline is empty in step 910, the process determines if the load miss queue is empty (step 912). If the load miss queue is not empty, the process issues a stall (step 908). If the process determines the load miss queue is empty in step 912, the process determines if the store queue is empty (step 914). If the store queue is not empty, the process issues a stall (step 908). If the process determines the store queue is empty in step 914, the process proceeds with instruction issue (step 906).

Aspects of the present invention allow a information handling system to enter a single step mode for instruction issue when pipeline problems are detected preventing architected instructions from executing. For example, if a microcode instruction within a non-re-entrant microcode routine is flushed, the microcode routine must be restarted from the beginning. In some cases, the microcode routine may be continuously restarted because of dependencies conflicts. By entering a single step mode, the microcode routine may be serially processed until all of the instructions are completed. Once the microcode routine is processed, the system proceeds with normal instruction issue. As a result, architected instructions within the pipeline make constant steady progress even if instructions in the pipeline are processed serially to overcome occasional instruction deadlocks, slowing, problems, or errors.

The illustrative embodiments can take the form of an entirely hardware embodiment, an entirely software embodiment or an embodiment containing both hardware and software elements. The illustrative embodiments are implemented in software, which includes but is not limited to firmware, resident software, microcode, etc.

Furthermore, the illustrative embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A information handling system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the information handling system to become coupled to other information handling systems or remote printers or storage devices through intervening private or public networks. Modems, cable modem and Ethernet cards are just a few of the currently available types of network adapters.

The description of the illustrative embodiments have been presented for purposes of illustration and description, and is not intended to be exhaustive or limited to the illustrative embodiments in the form disclosed. Many modifications and variations will be apparent to those of ordinary skill in the art. The embodiment was chosen and described in order to best explain the principles of the illustrative embodiments, the practical application, and to enable others of ordinary skill in the art to understand the illustrative embodiments for various embodiments with various modifications as are suited to the particular use contemplated.

What is claimed is:

1. A computer implemented method for ensuring forward progress of instructions in a pipeline of a processor, the computer implemented method comprising:

receiving at least one architected instruction in the pipeline, the architected instruction being implemented using a microcode routine that includes a plurality of micro-instructions;

counting instruction flushes in the pipeline using a counter that is included within a component in a completion unit in the processor to determine a flush count;

receiving, within the component, a completion signal in response to the architected instruction completing successfully;

receiving, within the component, a flush signal in response to flushing one of the plurality of micro-instructions;

outputting, by the component, control signals that are used to control the counter, the control signals being selected using the completion signal and the flush signal;

responsive to the flush count exceeding a threshold, entering a single step mode in the pipeline;

responsive to entering the single step mode, executing the plurality of micro-instructions in serial until the architected instruction is complete;

wherein in single step mode, a next micro-instruction in the microcode routine is not issued for execution until a prior micro-instruction has completed execution; and responsive to the architected instruction completing, exiting the single step mode in the pipeline and returning to fully pipelined mode.

2. The computer implemented method of claim 1, wherein the counting step further comprises:

monitoring the architected instruction in the pipeline to determine if the architected instruction is stalled;

responsive to the architected instruction stalling, receiving the flush signal ; and counting a number of times the flush signal is received to determine the flush count.

3. The computer implemented method of claim 1, further comprising:

executing the microcode routine including executing the plurality of micro-instructions;

flushing one of the plurality of micro-instructions; and responsive to flushing the one of the plurality of micro-instructions:

re-executing the plurality of micro-instructions from the beginning of the microcode routine; and incrementing the flush count.

4. The computer implemented method of claim 2, comprising:

responsive to the architected instruction completing, resetting the flush count to zero; and responsive to the flush count being reset to zero, exiting the single step mode in the pipeline and returning to fully pipelined mode.

5. The computer implemented method of claim 1, further comprising:

indicating, by a current value of the counting, the flush count;

the control signals being a reset signal, an increment signal, and a hold signal;

outputting, by the component, the reset signal in response to the completion signal being asserted;

resetting the current value of the counter to zero in response to the counter receiving the reset signal;

outputting, by the component, the increment signal when the completion signal is not asserted and the flush signal is asserted;

incrementing the current value of the counter in response to the counter receiving the increment signal;

outputting, by the component, the hold signal when neither the completion signal nor the flush signal is asserted; and holding, by the counter, the current value of the counter in response to the counter receiving the hold signal.

6. The computer implemented method of claim 1, wherein the threshold is user selectable or is eight.

7. The computer implemented method of claim 1, further comprising:

storing load and store operations of the instructions in a store queue and holding information on load data cache misses of the instructions in a load miss queue.

8. The computer implemented method of claim 7, further comprising:

issuing a stall to prevent the pipeline from issuing instructions, thereby ensuring that conflicts between the instructions are resolved before an instruction issues.

9. The computer implemented method of claim 8, wherein the issuing step is initiated when any of the architected instruction has a dependency, the pipeline is not empty, the load miss queue is not empty, and the store queue is not empty.

10. The computer implemented method of claim 1, wherein the plurality of micro-instructions are executed in serial when a detection subsystem receives any of a synchronization instruction, a debug mode control signal, and a slow mode control signal.

* * * * *